United States Patent
Felsl et al.

(10) Patent No.: US 8,342,554 B2
(45) Date of Patent: Jan. 1, 2013

(54) SUSPENSION FORK

(75) Inventors: Andreas Felsl, Bad Wiessee (DE); Stephan Albrecht, Gmund (DE); Stephan Kotzlowski, Tegernsee (DE)

(73) Assignee: B-Labs AG, Biel (CH)

( * ) Notice: Subject to any disclaimer, the term of this patent is extended or adjusted under 35 U.S.C. 154(b) by 107 days.

(21) Appl. No.: 12/866,798

(22) PCT Filed: Feb. 16, 2009

(86) PCT No.: PCT/DE2009/000203
§ 371 (c)(1),
(2), (4) Date: Nov. 2, 2010

(87) PCT Pub. No.: WO2009/100718
PCT Pub. Date: Aug. 20, 2009

(65) Prior Publication Data
US 2011/0042915 A1 Feb. 24, 2011

(30) Foreign Application Priority Data
Feb. 15, 2008 (DE) .......................... 10 2008 009 426

(51) Int. Cl.
*B62K 19/00* (2006.01)
(52) U.S. Cl. ........................................................ 280/276
(58) Field of Classification Search .................. 280/276, 280/279
See application file for complete search history.

(56) References Cited

U.S. PATENT DOCUMENTS

| 3,524,658 A | | 8/1970 | de Carbon | |
| 3,797,615 A | * | 3/1974 | Stembridge | 188/285 |
| 4,290,511 A | | 9/1981 | de Baan et al. | |
| 4,553,769 A | * | 11/1985 | Kawaguchi | 280/276 |
| 4,971,344 A | * | 11/1990 | Turner | 280/276 |
| 6,105,945 A | | 8/2000 | Takeuchi et al. | |
| 2006/0103075 A1 | * | 5/2006 | Zahn | 277/436 |

FOREIGN PATENT DOCUMENTS

| CH | 281935 | 7/1952 |
| DE | 32 13 904 A1 | 11/1982 |
| DE | 10 2006 010 245 A1 | 9/2007 |
| GB | 2 096 953 A | 10/1982 |
| WO | WO 2007/098896 A1 | 9/2007 |

OTHER PUBLICATIONS

Maj et al.; "Self-Lubricating Rod Guide for Vehicle Suspension;" *Research Disclosure*; Feb. 1, 2004; vol. 478, No. 64; Mason Publications; Hampshire, United Kingdom (Abstract and Figure Only).
International Search Report dated Jun. 5, 2009 in corresponding International Application No. PCT/DE2009/000203 (with translation).
International Preliminary Report on Patentability/Written Opinion of the International Searching Authority dated Sep. 7, 2010 in corresponding International Application No. PCT/DE2009/000203.

* cited by examiner

*Primary Examiner* — Tashiana Adams
(74) *Attorney, Agent, or Firm* — Oliff & Berridge, PLC

(57) ABSTRACT

Disclosed is a suspension fork for a two-wheeler with a fork leg comprising a stanchion tube fixed to the frame which immerses in a slide tube in sections, wherein the guiding between the slide tube and the stanchion tube is performed via a bearing arrangement. In accordance with the invention, an additional lubricant volume is provided by means of which a sufficient lubrication of the bearing arrangement is ensured.

11 Claims, 3 Drawing Sheets

Section A-A

SUSPENSION FORK

Figure 1:
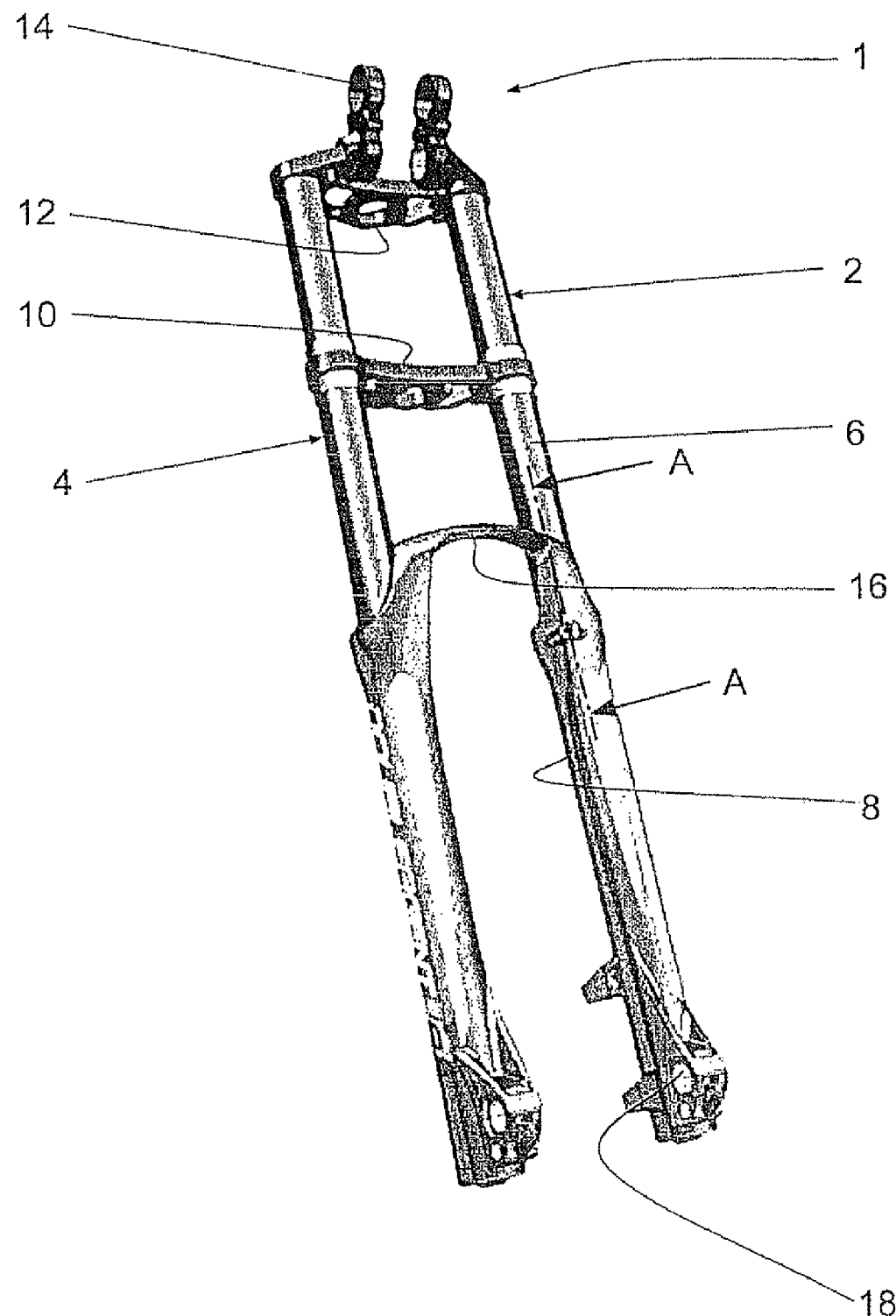

The invention relates to a suspension fork for a two-wheeler, in particular for a mountain bike, in accordance with the preamble of claim 1.

In the case of most two-wheelers, in particular in the case of motor cycles and mountain bikes, suspension forks are used for guiding the front wheel on a frame. The basic construction of such suspension forks is, for instance, described under http:de.wikipedia.orgwikifedergabel. Such suspension forks usually have two fork legs, each comprising a stanchion tube fixed with respect to the frame and a slide tube carrying a hub of the front wheel. In the case of so-called upside down suspension forks, the thinner slide tubes each comprise a dropout on which the hub is fastened. These slide tubes immerse into the stanchion tubes designed with a substantially larger diameter, said stanchion tubes being connected with the steering stem tube via one, in most cases two, triple trees. Such upside down suspension forks are frequently used with motor cycles. The most frequent configuration in the case of mountain bikes are so-called right side up suspension springs in which the thinner stanchion tubes are connected with the triple tree(s) and immerse into the slide or immersion tubes carrying the hub.

The known suspension forks comprise steel springs, elastomeric suspension andor air suspension which are each assigned with a damper. In most applications, a hydraulic damper is provided, wherein, for instance, in the case of a right side up suspension spring an open oil reservoir is formed in the hub-side, comparatively thick slide tube. In the case of an axial displacement of this slide tube with respect to the stanchion tube that is stationary relative thereto, the resulting diminution of a pressure chamber accommodating part of the oil causes oil to be displaced therefrom and to be displaced via a valve, for instance, an adjustable throttle aperture, to another pressure chamber, so that a dampening of the suspension takes place.

The mounting of the slide tube on the stanchion tube is commonly performed via two spaced-apart bearing bushings, wherein a preferably large distance is aimed for so as to improve the stiffness of the suspension fork. The sealing of the inner space of the slide tube which accommodates the oil reservoir is performed by means of a seal, also referred to as scraper ring, which is inserted in the stanchion-side annular front face of the slide tube and abuts in a sealing manner on the outer circumference of the thinner stanchion tube.

It is a problem with such constructions to supply the top slide bearing as well as a scraper ring intended to retain dirt entering from outside sufficiently with oil, so that the fork has a good responding behavior even in the case of hard conditions. In other words, care has to be taken that, from the above-scraper ring towards the bottom, a sufficient lubricating film always exists at the stanchion tube guided in the slide tube. This is important especially with a view to the viscosity of the oil which changes with temperature since it is, for instance, in the winter at low temperatures very difficult to produce the above-described lubricating film in the region of the top slide bearing. In the case of large temperature differences it may even be necessary to exchange the oil depending on the range of application. For a proper functioning of the suspension fork it is then important that the predetermined filling level of the damper arrangement is observed—frequently, too much oil is filled in during refilling, so that the sealing elements are damaged accordingly. In the case of lacking lubrication it may happen that the above-mentioned scraper ring is lifted off and thus dirt penetrates into the region of the sliding guide, so that the responding behavior of the fork cannot meet the requirements anymore.

In contrast to this it is an object of the invention to provide a front wheel fork with which a sufficient lubrication that is easy to handle is guaranteed even in the case of unfavorable conditions.

This object is solved by a suspension fork with the features of claim 1.

In accordance with the invention, the suspension fork provided for a two-wheeler, in particular for a mountain bike, comprises at least one fork leg comprising a stanchion tube which is supported on the frame and at which a slide tube carrying a hub is guided to be shifted via a bearing arrangement. The sealing between the slide tube and the stanchion tube is performed by a seal. In accordance with the invention, the suspension fork is designed with a lubricant volume restricted in radial direction by the inner circumference wall of the slide tube and by the outer circumference wall of the stanchion tube at the front side, on the one hand, by the seal and, on the other hand, by an inner seal. For filling the lubricant volume, the suspension fork is designed with a filling junction opening preferably in the region of the inner seal and—in a variant—with a further overflow junction arranged in the region of the upper seal, so that a complete filling and emptying of the lubricant volume is guaranteed.

By means of this lubricant volume there is always ensured that a sufficient lubricating film can develop in the region of the bearing arrangement at the outer circumference of the stanchion tube, so that the responding behavior of the suspension fork remains practically unchanged even in the case of difficult ambient conditions, for instance, in the case of high temperature differences and even in the case of rides through heavy soil and slurry with a corresponding pollution of the carriage components.

The lubricant volume that has preferably nothing to do with the oil reservoir of hydraulic forks provides the possibility of using different oils optimized with regard to the respective application (dampinglubrication) for the damping and for the oil volume.

In a preferred embodiment of the invention, the bearing arrangement comprises two bearing bushings that are axially spaced apart from each other. In a variant, the inner seal for restricting the lubricant volume may be disposed between the bearing bushings, so that a lubrication in the region of the upper bearing bushing by the lubricant volume is guaranteed.

In an alternative solution, the lubricant volume may extend in axial direction also beyond the second, lower bearing bush to the hub.

The bearing bush disposed inside the lubricant volume comprises preferably a plurality of inner longitudinal grooves each forming passage channels for the oil.

To enable a transverse distribution of the oil inside the slide bearing, these passage channels are connected with each other in circumferential direction.

The construction according to the invention can be used well with suspension forks with suspension travel adjustment since in such conventional solutions the available space for an oil reservoir assigned to a damping is further confined, and the initially described lubricating problems thus occur increasingly.

Other advantageous further developments of the invention are the subject matter of further subclaims.

In the following, a preferred embodiment of the invention will be described in detail by means of schematic drawings.

Figure 2:
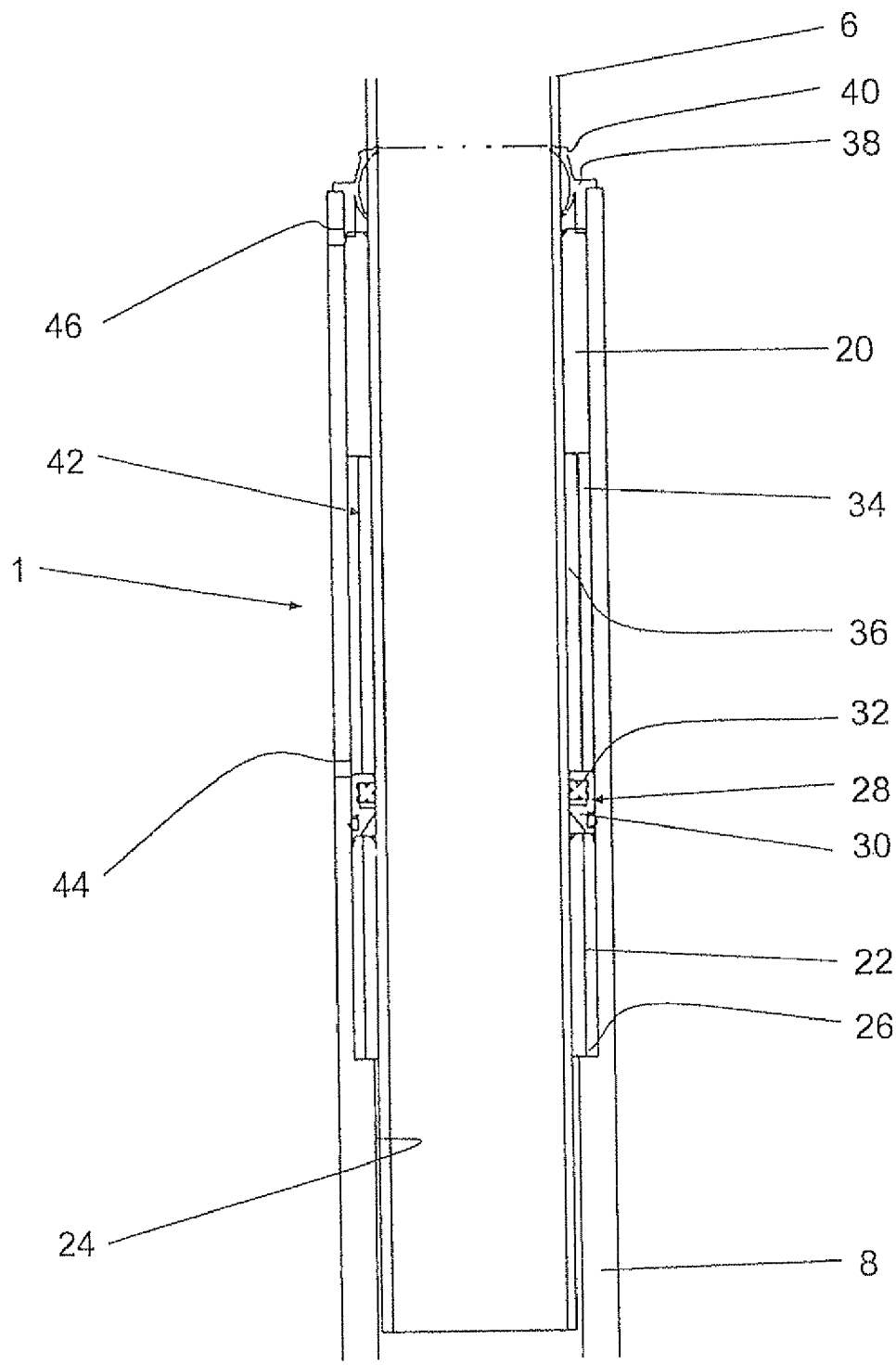
Figure 3:
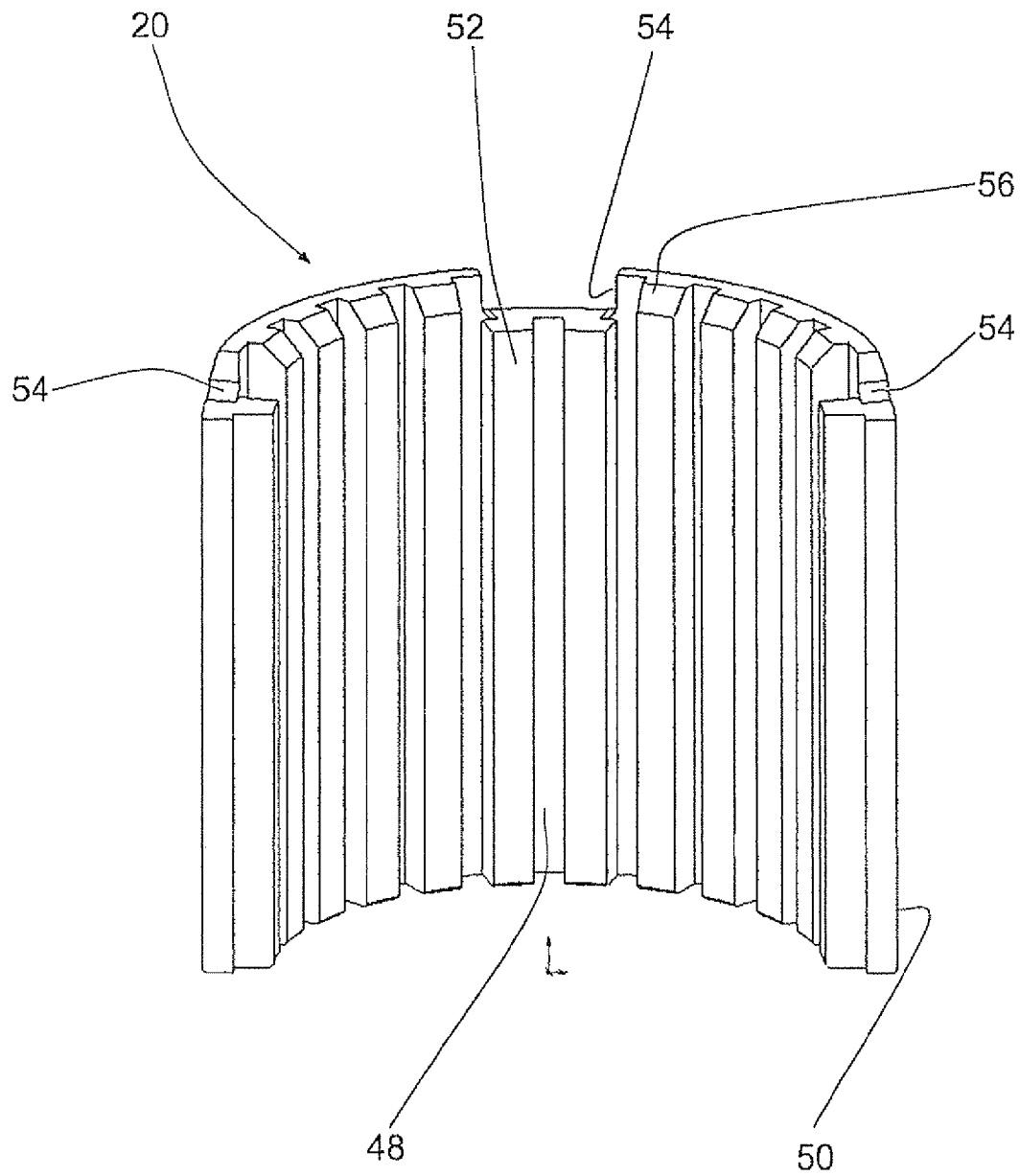

There show:

FIG. 1 a view of a suspension fork for a mountain bike;

FIG. 2 a sectional view through a fork leg of the suspension fork of FIG. 1; and FIG. 3 a sectional view of a bearing bush of the suspension fork according to FIG. 1 and FIG. 2.

FIG. 1 shows an embodiment of a suspension fork for mountain bikes. Details of this suspension fork may be found under www.bionicon.de, so that only the elements that are essential for the understanding of the invention will be described here. It is a matter of fact that the invention may also be used with other suspension fork constructions.

The suspension fork 1 comprises two fork legs 2, 4, each comprising a stanchion tube 6 which is stationary with respect to the frame and which immerses into a slide tube 8 of larger diameter. It is hence the matter of a so-called right side up fork. The two stanchion tubes 6 are connected with each other via two spaced apart triple trees 10, 12 that are clamped at the outer circumference of the stanchion tubes 6. The upper triple tree 12 in FIG. 1 carries an adjustable handle bar stem 14. The suspension fork 1 is supported at the head tube of the frame via the two triple trees 10, 12 and a head tube stem and a headset that are not illustrated.

To increase the stiffness of the suspension fork 1, the two lower slide tubes 8 are also connected with a bridge 16 that is drawn somewhat upward toward the stanchion tubes 6 so as to provide available space for the front wheel. At the—in FIG. 1—lower end sections of the slide tube 8 dropouts 18 are each provided for accommodating a front wheel hub.

In the interior of the slide tube 8 one suspension element (elastomer, steel spring, air suspension means) each is disposed which a hydraulic damping may be assigned to. The oil reservoir of this hydraulic damping may also be accommodated in the slide tube 8. In the illustrated embodiment the suspension fork 1 is additionally designed with a suspension travel adjustment.

FIG. 2 shows a simplified sectional view along the line A-A in FIG. 1, wherein the outer geometry of the slide tube 8 is illustrated in a simplified manner.

As already explained above, the stanchion tube 6 being designed with a comparatively smaller diameter immerses into the slide tube 8 and is guided therein via a slide bearing arrangement with two bearing bushings 20, 22 that are axially spaced apart from each other. The construction thereof will be described in the following. For accommodation of these two bearing bushings 20, 22, the inner circumference wall 24 is expanded in steps in the bearing region, so that an annular shoulder 26 is formed at which the—in FIG. 2—lower bearing bushing 22 is supported. On the—in FIG. 2—upper annular front surface of the bearing bushing 22 there rests an inner seal 28 that is inserted in the expanded portion of the slide tube 8. In the illustrated embodiment, this inner seal 28 consists of an external O-ring 30 encompassing an X-ring 32 that is more favorable with respect to the dynamic strains. Instead of this arrangement, a special sealing ring manufactured with an injection molding method may also be used. The inner seal 28 is followed in the expanded portion of the slide tube 8 by a spacer sleeve 34 the diameter of which is, however, larger than the outer diameter of the stanchion tube 6, so that an annular chamber 36 is left. On the upper front surface of the spacer sleeve 34 there rests the second bearing bushing 20 that is kept in contact with the spacer sleeve 34 via a scraper 38. This scraper 38 is inserted in the—in FIG. 2—upper end portion of the slide tube 8 and comprises sealing lips 40 by means of which it is in sealing contact with the outer circumference of the stanchion tube 6. The scraper 38 and the inner seal 30 restrict in axial direction, and the inner circumference wall of the slide tube 8 and the outer circumference wall of the stanchion tube 6 restrict in radial direction an additional lubricant volume 42 that also comprises the afore-described annular chamber 36. This additional volume may be filled with oil to ensure a sufficient lubrication of the upper bearing bushing 20 that is positioned inside this additional lubricant volume 42.

For filling this additional lubricant volume 42, a filling junction 44 and an overflow junction 46 are formed in the circumferential wall of the slide tube 8, into which a filling or overflow fitting, respectively, may be inserted. In the illustrated embodiment, these junctions 44, 46 are designed as bores, wherein the filling junction 44 opens into the lubricant volume 42 just above the inner seal 28 and the overflow junction 46 just below the scraper 38, so that a reliable filling and also a complete discharging of this oil is guaranteed.

FIG. 3 shows the basic structure of the bearing bush 20 with only one half being illustrated for the sake of clearness. Accordingly, the bearing bush 20 comprises at the inner circumference wall thereof a plurality of passage channels 44 which extend axially parallel and are distributed evenly at the circumference. The bearing bush 20 is inserted with the outer circumference area 50 thereof into the slide tube 8 while the longitudinal faces 52 of bars confining the passage channels 50 act as slide faces for the stanchion tube 6.

At least at the annular front surface of the bearing bush 20 which faces the scraper 38 there are provided four grooves 54 that are distributed at the circumference, only three of which may be seen in the illustration of FIG. 3. Corresponding projections of the scraper 38 may immerse therein. A bevel 56 that arranges for a transverse joint to exist between the passage channels 48, so that the oil may distribute in transverse direction is formed at the inside circumferential edge of this annular front surface. This transverse distribution is supported by the grooves 54. This way it is ensured that a sufficient lubricating film may always develop in the contact area between the upper bearing bush 20 and the stanchion tube 6.

In the illustrated embodiment, the bottom, hub-side bearing bush 22 is positioned outside this additional oil volume. As a matter of principle, the inner seal 28 could, however, also be positioned below this bearing bush 22, so that it is also lubricated via the additional oil volume.

To simplify matters, the bottom bearing bush 22 is designed in the same way as the bearing bus 20 described in FIG. 3.

The construction according to the invention ensures that the two bearing bushings 20, 22 are adapted to be arranged at a maximum distance to each other even with forks with suspension travel adjustment, and that the top bearing bushing 20 and the scraper 38 (it produces the most friction in the system) are always lubricated sufficiently, so that the suspension fork 1 maintains its predetermined responding behavior even in the case of unfavorable ambient conditions, wherein the oil filling may be exchanged in a very simple manner so as to ensure optimum lubrication with different temperatures and fields of application.

As a matter of principle, the construction according to the invention may also be used with suspension forks in which the slide tube immerses into the stanchion tube.

Disclosed is a suspension fork for a two-wheeler with a fork leg comprising a stanchion tube fixed to the frame which immerses in a slide tube in sections, wherein the guiding between the slide tube and the stanchion tube is performed via a bearing arrangement. In accordance with the invention, an additional lubricant volume is provided by means of which a sufficient lubrication of the bearing arrangement is ensured.

LIST OF REFERENCE SIGNS 1 suspension fork
2 fork leg
4 fork leg
6 stanchion tube
8 slide tube
10 triple tree
12 triple tree
14 handle bar stem
16 bridge
18 dropout
20 bearing bush
22 bearing bush
24 inner circumference wall
26 annular shoulder
28 inner seal
30 O-ring
32 X-ring
34 spacer sleeve
36 annular chamber
38 scraper
40 sealing lips
42 lubricant volume
44 filling junction
46 overflow junction
48 passage channels
50 outer circumference face
52 longitudinal face
54 recesses
56 bevel

The invention claimed is:

1. A suspension fork for a two-wheeler, with at least one fork leg comprising a frame-side stanchion tube at which a slide tube is guided to be shifted in sections via a bearing arrangement, wherein the sealing of the slide tube is performed by a seal that is in sealing contact with the outer circumference of the stanchion tube, a lubricant volume formed in an annular chamber between said slide tube and said stanchion tube and confined at the front side by said seal, and by an inner seal, wherein said annular chamber is accessible through at least one filling junction.

2. The suspension fork according to claim 1, wherein the bearing arrangement comprises two axially spaced-apart bearing bushings and said inner seal is positioned between said bearing bushings.

3. The suspension fork according to claim 1, wherein said inner seal is positioned below said bearing arrangement.

4. The suspension fork according to claim 1, wherein said bearing bushing comprises a plurality of inner longitudinal grooves each forming a passage channel for the lubricant.

5. The suspension fork according to claim 4, wherein said passage channels are connected with each other in circumferential direction.

6. The suspension fork according to claim 5, wherein a bevel is formed at the front side in the region of the passage channels.

7. The suspension fork according to claim 1, wherein said filling junction opens in the region of said inner seal, and wherein an overflow junction for filling the oil volume is positioned in the region of said seal.

8. The suspension fork according to claim 1, comprising two fork legs that are connected with a head tube stem via at least one triple tree.

9. The suspension fork according to claim 1, comprising a suspension travel adjustment.

10. The suspension fork according to claim 1, comprising a hydraulic damping with an oil reservoir that is separated from the lubricant volume.

11. The suspension fork according to claim 10, wherein the lubricant in the lubricant volume and in the oil reservoir is different.

* * * * *